Patented Sept. 10, 1929.

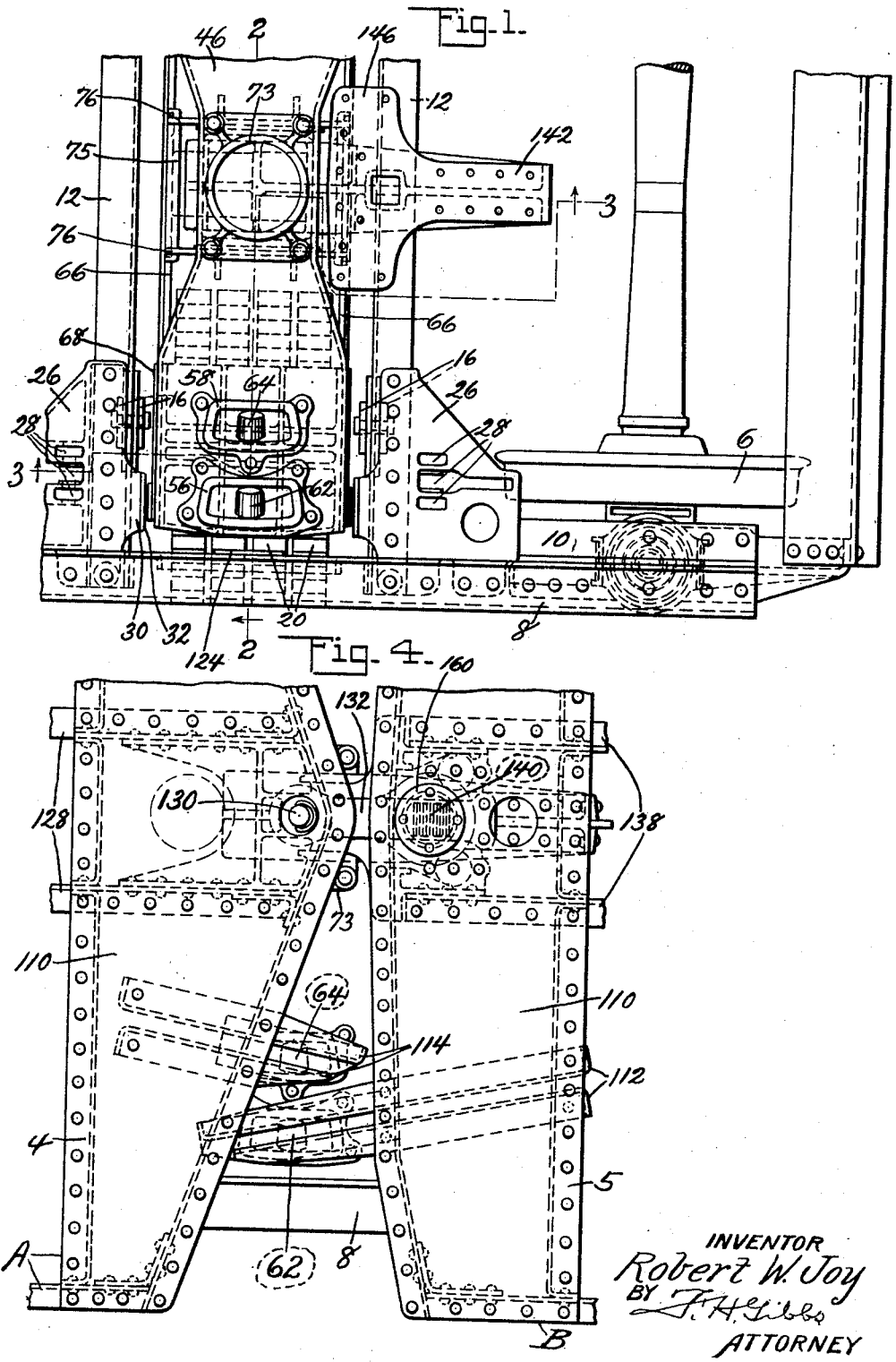

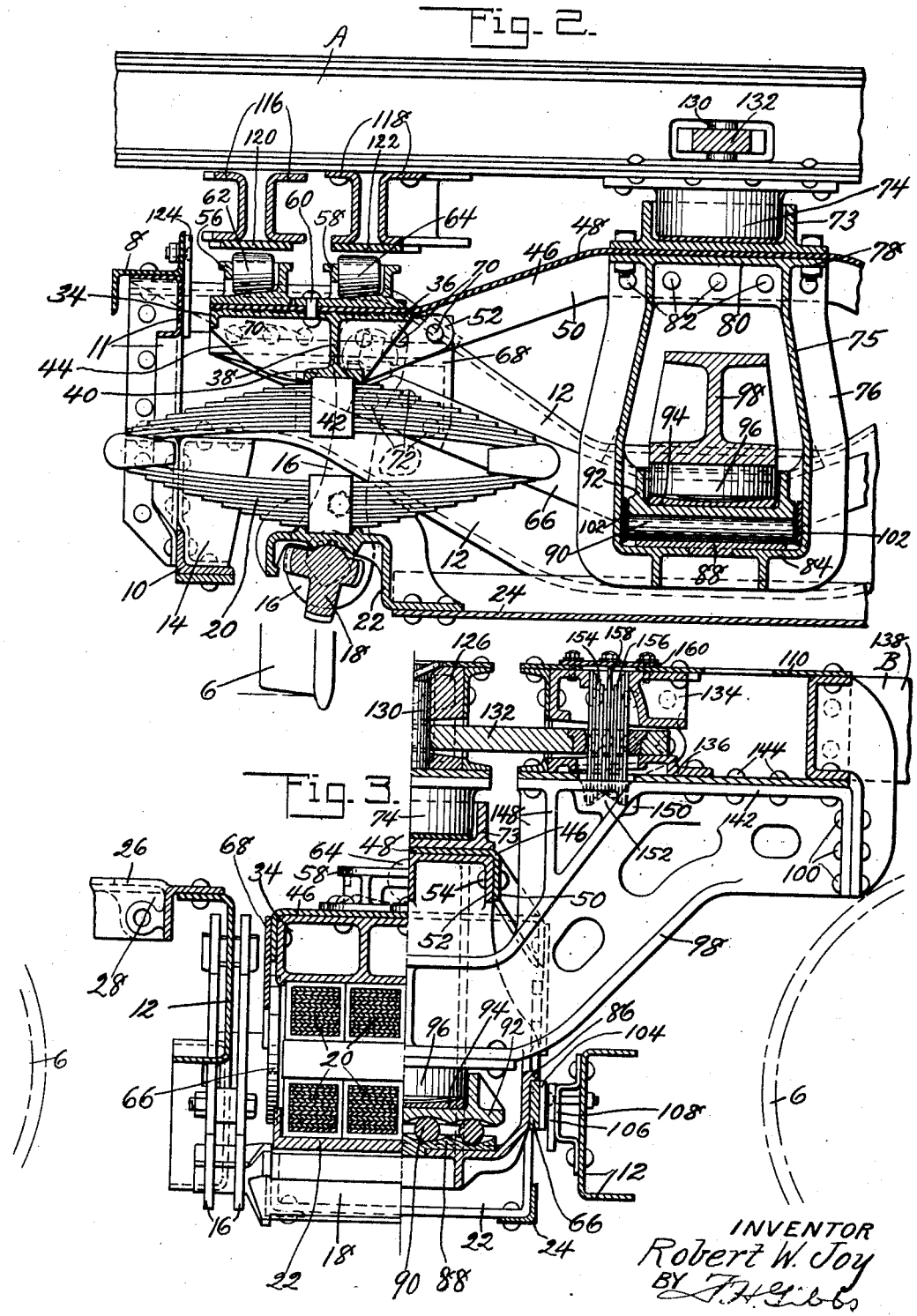

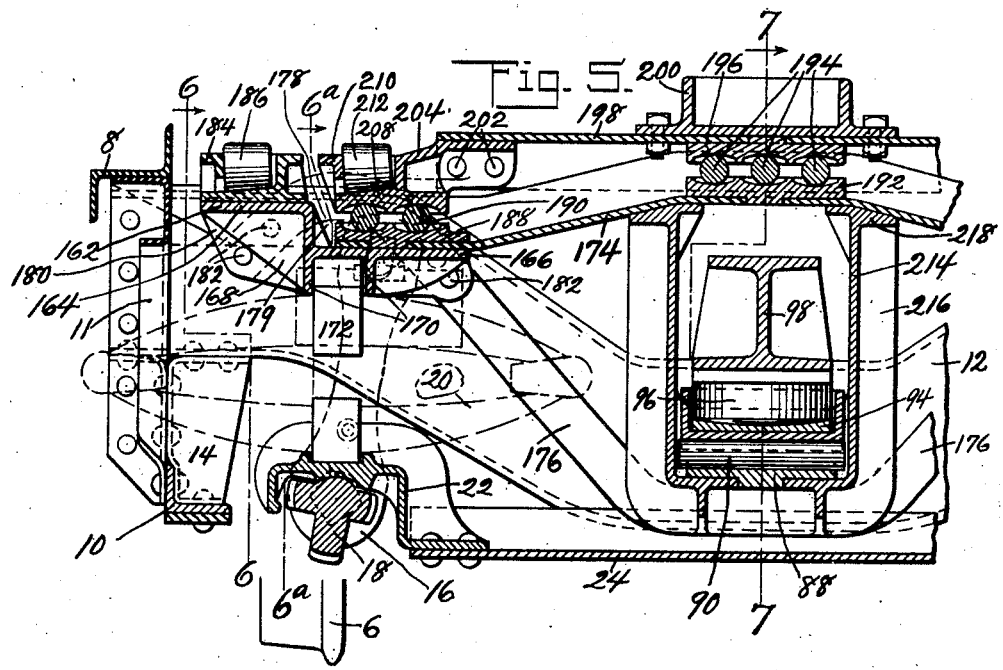
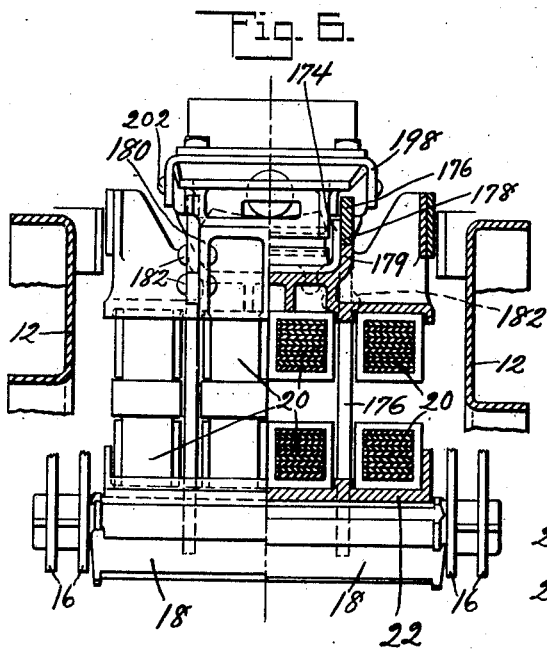
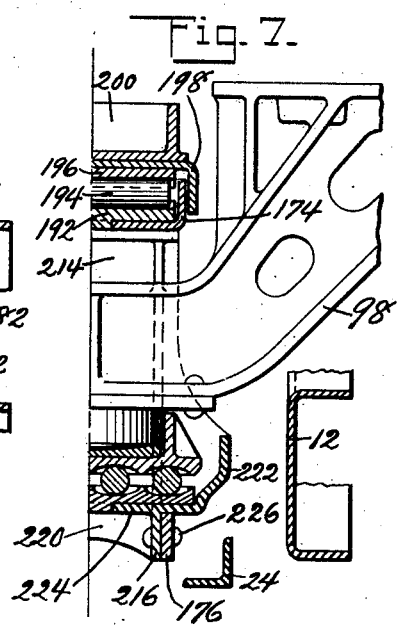

1,727,712

UNITED STATES PATENT OFFICE.

ROBERT W. JOY, OF BROOKLYN, NEW YORK, ASSIGNOR TO AMERICAN CAR AND FOUNDRY COMPANY, OF NEW YORK, N. Y., A CORPORATION OF NEW JERSEY.

ARTICULATED CAR.

Application filed December 1, 1927. Serial No. 237,014.

Reference is had to the accompanying drawings which illustrate the preferred form of the invention; though it is to be understood that the invention is not limited to the exact details of construction shown and described, as it is obvious that various modifications thereof within the scope of the claims will occur to persons skilled in the art.

In the drawings:

Figure 1 is a partial top plan view of the truck forming a part of the present invention;

Fig. 2 is a sectional view on the line 2—2 of Fig. 1;

Fig. 3 is a sectional view taken on the line 3—3 of Fig. 1;

Fig. 4 is a partial top plan view of the adjacent ends of two car bodies, the truck being in the greater part omitted;

Fig. 5 is a sectional view similar to Fig. 2, showing a modified form of the invention;

Fig. 6 is a composite view, the left-hand portion thereof being taken on the line 6—6 of Fig. 5, and the right-hand portion being taken on the line 6ª—6ª of Fig. 5; and Fig. 7 is a sectional view taken on the line 7—7 of Fig. 5.

This invention relates to transportation cars, and has particular reference to railway cars of the articulated unit type.

One object of this invention is the provision of improved means for supporting the adjacent ends of two car bodies on a single car truck which will permit free relative movements of the bodies with respect to each other and with respect to the car truck.

A further object of the invention is to provide a car truck having a single bolster for supporting the adjacent ends of two car bodies in such a manner as to permit relative movements of the car bodies with respect to each other and with respect to the car truck.

A still further object is the provision of an articulated car unit including a truck having vertically alined body center bearings for supporting the adjacent ends of two car bodies.

Another object of the invention is the provision of an articulated car unit so arranged and formed as to support the adjacent ends of two car bodies to permit relative movements of the car bodies with respect to the truck and with respect to each other, formed of few parts and which is strong and durable in operation.

Other objects and advantages of this invention will be apparent from the following description taken with the accompanying drawings, in which an articulated car unit is shown for mounting and connecting the adjacent ends 4 and 5 of two car bodies indicated generally at A and B respectively, the car ends only being shown in the drawings.

The invention includes a car truck mounted on wheels 6 and having a frame including the usual pedestals, the top chords 8 in the form of Z-bars, the trusses 10 and a center brace 11. The truck is further provided with spaced transoms 12 which are secured to the top chords 8, center brace 11 and a pressing 14 secured to the trusses, as clearly shown in Fig. 2. From the transoms 12, are hung swing links 16 which support the swing link adjuster or cross-bar 18. The cross-bar 18 may be adjusted in any suitable and desired manner, and it supports the elliptic springs 20. Mounted on the adjustable cross-bar 18 is the reinforced truck spring seat 22 to which is secured the spring plank 24. The transoms 12 are not straight from side to side of the truck but are provided with a dipped portion intermediate their ends for a purpose to be hereafter described. The top chords 8 and transoms 12 are connected and reinforced by gussets 26 provided with apertures 28 for the reception of brake levers and hangers, not shown, and said gussets are each provided with a depending protruding element 30 having a wear plate 32 secured thereto, as clearly shown in Fig. 1.

The elliptic springs 20 support spring caps indicated generally at 34 in Fig. 2, wherein is clearly shown the construction thereof. As shown in this figure, these spring caps each comprise a supporting plate 36 provided with a depending leg 38 terminating in a recessed base 40 which seats on the spring bands 42. The plate 36 is reinforced by longitudinal and transverse webs 44 as more particularly shown in Fig. 1.

In Fig. 2 is clearly shown a bolster which is of the truss type and comprises an upper or compression member 46 of channel shape, the web portion 48 of which extends over and lies upon the plate 36 and the side flanges or chords 50 lie adjacent the side flanges 52 of the plate 36, as clearly shown in Fig. 3. The compression member is rigidly secured or attached to the plate 36 by means of rivets 54 or the like extending through the adjacent flanges heretofore mentioned, and positioned on the web 48 of the compression member are sockets 56 and 58 respectively which are secured to the plate 36 by means of rivets 60 or the like, thus affording a rigid connection of the compression member, the sockets 56 and 58 and the spring cap 34. The sockets 56 and 58 each receive a bearing preferably of the roller type indicated at 62 and 64 respectively.

The tension member of the truss bolster is indicated at 66 and the end of said tension member 66 is connected to the compression member 46 by means of a gusset 68 riveted to the compression member as shown at 70, and to the tension member as shown at 72. The compression member 46 is bowed inwardly intermediate the ends as shown clearly in Fig. 1 and said compression member has secured thereto a truck center bearing 73 which swivelly receives a body center bearing 74 carried by the end of car A.

The tension members have attached thereto a lower center bearing casting indicated generally at 75, the same being provided with spaced reinforcing webs 76 extending completely around the casting and being merged with the extensions 78 of the casting head 80; rivets 82 being provided for securing the casting 75 to the compression members. The casting 75 is more particularly of the form shown in Fig. 2, and is provided with a bottom 84 which is flanged as shown at 86 in Fig. 3 to be supported by the tension members 66. The bottom 84 receives a bearing plate 88 which supports bearings 90 of the roller type, and positioned upon the bearings 90 is a socket 92 having a bearing plate 94 upon which seats a body center bearing 96 secured to the lower end of a cantilever bar 98, the upper end of which latter is secured to the lower surface of the end of car B by means of rivets 100 or the like. The casting 75 is provided at its lower end with wear plates 102 for an obvious purpose. As heretofore mentioned in this description, the transoms are dipped intermediate their ends and this particular construction is provided in order to permit the positioning of the cantilever bar 98 with respect to the socket 92, as will be apparent.

The tension members 66 are provided with wear plates 104 which are adapted to contact with corresponding wear plates 106 mounted by brackets 108 secured to the transoms 12 as clearly shown in Fig. 3. The ends of cars A and B are provided with cover plates 110, and extending from said ends and secured to the lower surface thereof in such a position as to overlie the bearings 62 and 64 are body side bearings indicated generally at 112 and 114 respectively. The side bearings are preferably of the type shown in Fig. 2, and comprise spaced pressed channels 116 and 118 respectively secured to the underframe and connected by means of wear plates 120 and 122 respectively. The side bearings 114 of car A are positioned within the bearings 112 of car B and said bearings are so arranged as to overlap each other and to permit relative movement of the cars A and B without contact between said side bearings. It will be apparent that the bearings 114 are necessarily arranged within the bearings 112 in order that they may contact with the bearings 64 as will be obvious.

Secured to the top chords 8 of the truck frame and to the center brace 11 is a wear plate 124 for the purpose of taking lateral impact of the entire bolster assembly, it being apparent due to the swing links 16, under certain conditions, the entire bolster assembly will oscillate. Extreme oscillation will cause impact of the assembly with the truck side frame which will be taken by the wear plate 124.

The end of car A is provided with a casting 126 which is positioned between the center sill members 128 and said casting is apertured to receive a coupling pin 130 which extends through an opening in one end of a drawbar 132. The draw-bar extends to the end of car B, as clearly shown in Fig. 3, and the end of said drawbar is arranged between upper and lower castings 134 and 136 respectively secured between the center sill members 138 of car B, as clearly shown in Figs. 3 and 4. The end of the drawbar 132 which is extended between the castings 134 and 136 is provided with a ferruled aperture which takes a spring indicated generally at 140. The cantilever bar 98 is of the construction shown and particularly described in my co-pending application filed December 1, 1927, Serial No. 237,012, and only a brief description thereof is necessary. The bar comprises an attaching portion 142 which is secured to the underframe of car B by suitable rivets 144 and is provided with an enlarged head portion 146 (see Fig. 1) which is reinforced and strengthened by means of the brace and webs 148. The upper surface of the cantilever bar includes the attaching portion 142 and the head 146, and the same is provided with a well 150 having a partition 152 therein dividing the well into two portions as will be apparent from an inspection of Fig. 3. The spring 140 comprises two sections 154 and 156 respectively, the lower ends of which are extended into and are supported within the portions of the well 150 respectively. A retainer plate 158 is provided which serves as a wedge and is inserted between the two sections of the spring; the upper end of the retainer plate 158 is exposed, as shown clearly in Fig. 3, whereby to permit the end to be grasped and the retainer removed from between the two sections 154 and 156. The opening formed in the top plate 110 of car B is normally closed by a cover 160. The specific construction just described results in an assembly in which the drawbar is normally caused to act upon the substantial center of the spring 140 thereby obtaining the greatest efficiency of the spring.

Figs. 5, 6 and 7 disclose a modified form of the invention, in which the truck is identical with the truck shown in the other figures. In Fig. 5, the spring cap is designated generally at 162 and comprises an elevated supporting portion 164 and a lower supporting portion 166; the spring cap being provided with reinforcing webs 168 and also with depending flanges 170 which engage over the spring band 172 to support the spring cap. The bolster in this modification is of truss type and comprises the compression member 174 which is preferably a channel, the end thereof extending over the supporting portion 166 and being secured thereto by any suitable means such as rivets or the like. The bolster also comprises the tension members 176, the ends of which are arched as shown at 178 and rest upon correspondingly arched upper side flanges 179 of the spring cap and extend downwardly adjacent the depending side flanges 180 of the spring cap and are secured to the flanges 180 by means of rivets 182 or the like. The supporting portion 164 has secured thereto the socket member 184 within which is mounted the bearings 186 adapted to contact with side bearings (not shown) secured to the car end with which the truck is associated. The supporting portion 166 is provided with a bearing plate 188 which seats upon the end of the compression member 174 and is secured, with said end, to said supporting portion. The bearing plate 188 is recessed to provide seats for bearings 190.

The compression member 174 has secured thereto substantially midway between the ends a bearing plate 192 recessed to support roller bearings 194 which support a corresponding bearing plate 196 secured to the lower surface of a tie bar or spreader bar 198, the upper surface of which supports a truck center bearing 200 for the reception of a body center bearing (not shown) secured to a car end.

The spreader bar or tie bar 198 is of channel shape, as clearly shown in Figs. 6 and 7 and secured in the ends thereof by means of rivets 202 or the like is the attaching arm 204 of a bearing member comprising the bearing plate 208 recessed to seat upon the before-mentioned bearings 190.

The bearing member 208 comprises, in addition to the bearing plate just described, a socket 210 which receives a roller bearing 212 adapted to cooperate with a side bearing attached to an overlapping car end and similar to the side bearings heretofore described and shown in Figs. 2 and 4.

The compression members 174 of the truss bolster have attached thereto a lower center bearing casting quite similar to the casting shown in Fig. 2, and indicated generally at 214, the same being provided with spaced reinforcing webs 216 extending completely around the casting and merging with the upper flange 218 of the casting by which the casting is attached to the compression members 174. The casting 214 is provided with depending webs 220 at its base and with side flanges 222 extending from the bottom 224 of the casting; the bottom 224 seating on the tension members 176, and if desired, suitable rivets 226 may be employed to rigidly connect the tension members to the casting. The remainder of the structure of the casting and its bearings and the connection of the bearings with an adjacent car end is similar to the construction heretofore described with respect to Figs. 1 to 4 inclusive, and no further description is deemed necessary.

What is claimed is:

1. In an articulated car construction, a car truck, springs connected to said truck, a truss bolster supported by the springs, car ends overlapping the truck, a center bearing mounted on the compression member of the bolster for supporting one car end, and a center bearing mounted on the tension member of the bolster for supporting the other car end.

2. In an articulated car construction, a car truck, springs mounted on the truck, a truss bolster supported by the springs, car ends overlapping the truck, and alined center bearings mounted on the compression and tension members of the bolster respectively for supporting the car ends.

3. In an articulated car construction, a car truck, springs mounted on the truck and capable of lateral shifting, a spring cap mounted on the spring, bearings supported on the spring cap, a truss bolster secured to the spring cap, car ends overlapping the truck, a center bearing connecting one of said car ends with the compression members of the truss bolster, a second center bearing mounted on tension members of the bolster, means connecting the other car end with said second center bearing, and coupling means for the car ends.

4. In an articulated car construction, a car truck having springs, a truss bolster supported by said springs, a bearing support connected to the compression member, a second bearing support secured to the tension member, car ends overlapping the truck, a center bearing extended from one of said car ends and swivelly mounted in the first named bearing support, a cantilever bar secured to the other car end and extending downwardly over said second named bearing support and provided with a center bearing positioned in said support, and coupling means connecting the two car ends.

5. In an articulated car construction, a car truck having springs, a spring cap supported on said springs, a truss bolster secured to the spring cap, car ends overlapping the truck, vertically arranged alined center bearings secured to the compression and tension members respectively of the truck and respectively supporting the car ends, bearings supported on the spring cap, and side bearings extending from the car ends adapted to engage said bearings.

6. In an articulated car construction, a car truck having springs, means mounting said springs permitting lateral shifting thereof, a bolster carried by said springs and movable therewith, alined upper and lower bearing supports connected to the bolster, car ends overlapping said truck, bearings secured to the car ends and engaged respectively in said bearing supports, and means mounting the upper bearing support and permitting relative movement thereof with respect to the lower bearing support.

7. In an articulated car construction, a car truck, a bolster supported by the truck and provided with alined upper and lower bearing supports, a car end supported by each bearing support, and means coupling said car ends comprising a draw-bar rigidly and pivotally secured in one car end and resiliently secured in the other car end.

8. In an articulated car construction, a car truck, a bolster supported by said truck, a lower body center bearing carried by the bolster and supporting a car end, an upper body center bearing carried by the bolster and movable transversely thereof and supporting a second car end, side bearings for said car ends, and means coupling said car ends.

9. In an articulated car construction, a car truck, a truss bolster supported by the truck and movable transversely thereof, an upper body center bearing secured to the bolster and supporting a car end, a bearing casting connected to the compression and tension members of the bolster, a body center bearing secured to the casting below the upper body center bearing and alined therewith and supporting an adjacent car end, and side bearings for said car ends.

10. In an articulated car construction, a truck, an adjustable spring seat, springs supported thereby, spring caps supported by said springs and provided with bearings, a truss bolster secured to the spring cap and movable therewith, alined body center bearings secured to the compression and tension members respectively for supporting car ends, bearing plates secured to the car ends and adapted to contact with the bearings on said spring caps, and a draw-bar resiliently connecting said car ends.

11. In an articulated car construction, a car truck, a bolster, car ends overlapping the truck, and vertically alined center bearings secured to the bolster for supporting the car ends.

12. In an articulated car construction, a car truck, a bolster, car ends overlapping the truck, and vertically spaced center bearings secured to the bolster for supporting the car ends.

13. In an articulated car construction, a car truck, a bolster, car ends overlapping the truck, and vertically spaced center bearings supported by the bolster and movable relative to each other for supporting the car ends.

In witness whereof I have hereunto set my hand.

ROBERT W. JOY.